UNITED STATES PATENT OFFICE.

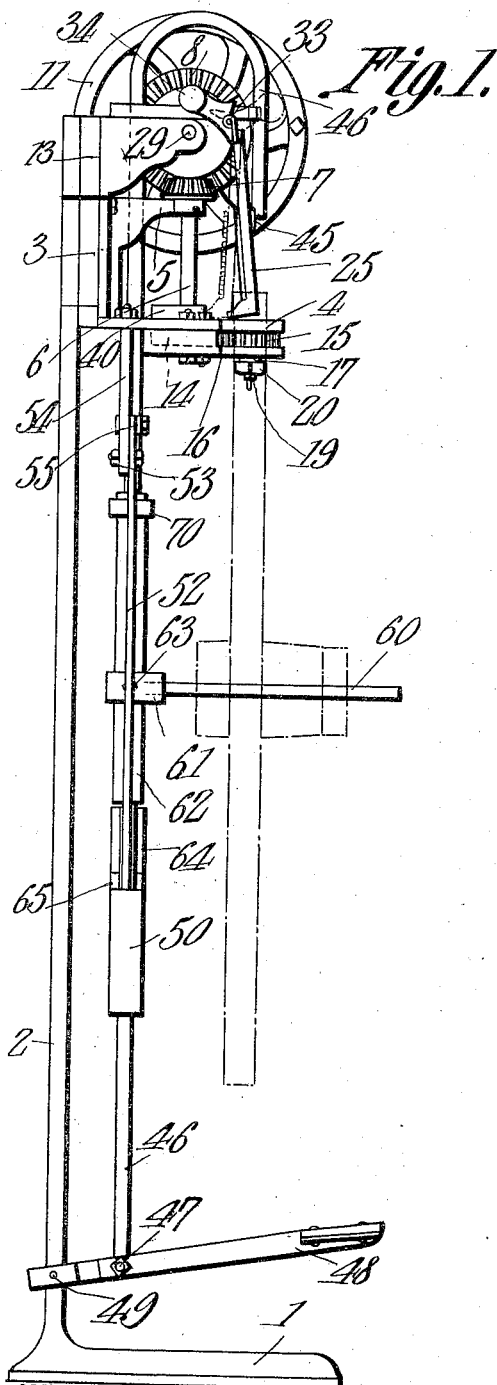

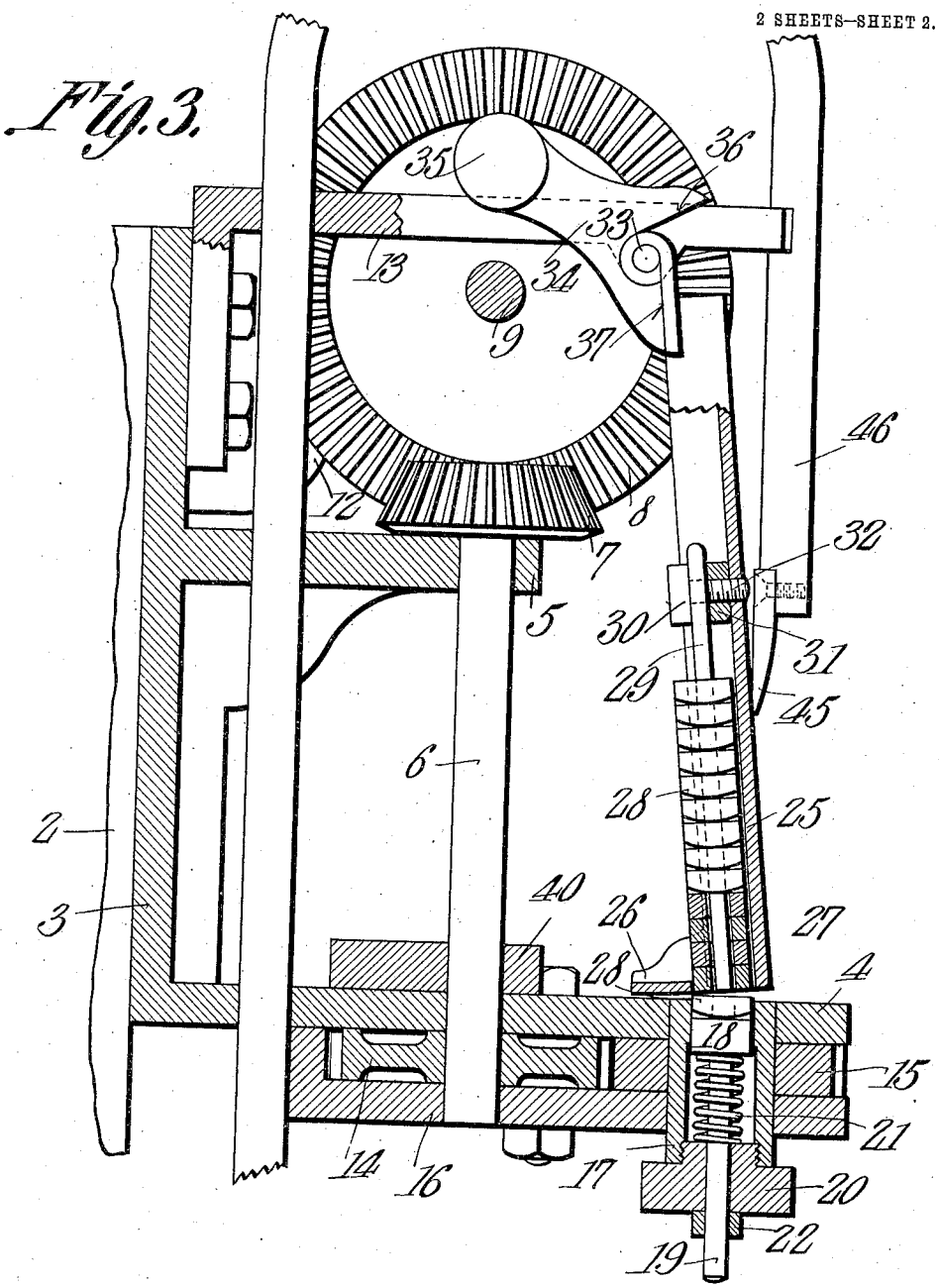

MATTHEW T. LONG, OF HELENA, OKLAHOMA, ASSIGNOR TO THE HELENA MANUFACTURING COMPANY, A CORPORATION.

TIRE-BOLTING MACHINE.

1,078,052.  Specification of Letters Patent.  Patented Nov. 11, 1913.

Application filed April 28, 1910, Serial No. 558,217. Renewed July 27, 1912. Serial No. 711,919.

*To all whom it may concern:*

Be it known that I, MATTHEW T. LONG, a citizen of the United States, residing at Helena, in the county of Alfalfa and State of Oklahoma, have invented a new and useful Tire-Bolting Machine, of which the following is a specification.

This invention relates to an automatic machine which is particularly adapted for applying nuts to and removing nuts from the tires of wheels and other articles, although the machine may be used in many other connections if desired.

One of the objects of the invention is to provide a machine of the character indicated which is adapted to operate on wheels of many different sizes or diameters.

A further object of the invention is to provide means for counterbalancing the weight of the wheel so as to permit it to be handled with great facility and by the expenditure of little effort on the part of the operator of the machine.

A further object of the invention is to provide means for adjustably gaging the position of the rim of the wheel so as to aline it accurately and positively with the nut removing or applying mechanism, the adjustable character of the gaging mechanism permitting the machine of the present invention to be used with wheels having rims of different thicknesses and other characteristics.

A further object of the invention is to provide wrench mechanism which is adapted either to apply nuts to or to remove nuts from the wheel which is being acted upon.

A further object of the invention is to provide means for automatically feeding nuts and the like to the wrench mechanism during the operation of applying nuts to the wheel rim, said feeding mechanism being adapted to be moved into and out of operation and to be held properly either in operative or in inoperative position.

A further object of the invention is to provide adjustable mechanism which is adapted to be employed for clamping the bolt in position in the tire during the operation of applying or removing nuts, whenever the necessity for such mechanism arises, it being understood that the mechanism herein provided for the purpose mentioned, can be used for many other purposes.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claims without departing from the spirit of the invention.

In the accompanying drawings forming part of this specification:—Figure 1 is a side elevation of a machine constructed in accordance with the invention. Fig. 2 is a front elevation thereof. Fig. 3 is an enlarged vertical section through the upper portion of the machine.

Like reference numerals indicate corresponding parts in the different figures of the drawings.

The particular embodiment of invention herein disclosed, briefly outlined, comprises a suitable standard or frame which carries the operating parts of the machine. The supporting means for the wheel which is being operated upon, preferably consists of a stud-shaft which is adapted to fit into the hub of the wheel so as to hold the wheel in such position that it may be readily rotated and that its rim will rest upon a suitable table or lateral arm on the support which carries the wrench mechanism for removing or replacing the nuts. For the purpose of causing the wheel holding or supporting mechanism to be adapted to receive wheels of different sizes, said supporting mechanism or stud-shaft preferably is adjustably mounted so that it can be moved in a vertical direction to receive wheels of different sizes and yet always cause the rim of said wheel to rest in proper position to be engaged by the wrench mechanism.

For the purpose of facilitating the upward and downward movement of the wheel necessary to cause the nut to fit into the wrench mechanism the wheel supporting mechanism preferably is counterpoised by means of a counter-weight or spring mechanism which is capable of adjustment to accommodate itself to wheels of different sizes and weights. By means of this mechanism the weight of the wheel is accurately counterpoised and the operator can therefore raise and lower the wheel with the expenditure of very little effort. The wrench mechanism preferably is rotary, and is provided with a removable plug, whereby to facilitate the operation of applying the nuts, the plug being removed from the wrench mechanism when it is desired to take off nuts, so as to permit the nuts to drop through the wrench mechanism as they are screwed off.

Suitable mechanism is provided for feeding nuts to the wrench, and a vertically adjustable device is provided for clamping the bolts firmly in the rim of the tire so as to hold them immovable during the operation of applying or removing nuts.

Having thus briefly outlined some of the principal features of the machine in order to facilitate the understanding thereof, a specific description of the device will now be given.

The frame of the machine preferably consists of a base 1 and a standard or upright 2, which parts may be of any suitable form and construction. Bolted or otherwise secured in any suitable manner to the upper end of the standard 1 is a casting 3 which preferably is formed with a lower extension producing a work table 4. The casting 3 is also formed with an upper extension or arm 5 in which is journaled a shaft 6 having on the upper end thereof a bevel gear 7 meshing with a large bevel gear 8 mounted on a shaft 9 and provided with an operating handle 10 mounted eccentrically on a wheel 11 which is fixed on the shaft 9. The shaft 9 is suitably journaled in side arms 12 formed on a casting 13 which is bolted or otherwise secured to the casting 3 in any suitable manner. The shaft 6, below the table 4, has fixed thereon a gear wheel 14 which is in mesh with a gear wheel 15 which operates the wrench mechanism for removing and applying nuts from the inner side of the rim of a wheel. The gear wheels 14 and 15 are located in a suitable housing 16. The wrench mechanism preferably consists of a tubular element 17 which extends through the gear wheel 15 in a vertical direction and is fixed therein in any suitable manner so as to rotate therewith, the upper end of the tubular member 17 terminating approximately flush with the upper surface of the operating table 4 as shown. The tubular member 17 at its upper end is formed with a square or angular bore to receive the nut which is to be applied or removed. Adjustably mounted within the wrench member or tube 17 is a plug 18 which is formed with a stem 19 that extends through a cap 20 screwed or otherwise detachably fitted into the lower end of the wrench member 17. A coil spring 21 preferably surrounds the stem 19 between the cap 20 and the plug 18. In the operation of the device, it is to be understood that the wheel which is to be acted upon is suitably held at its center below the table 4, so that its rim rests upon the upper surface of the table 4. If it is desired to remove nuts from the bolt of the wheel rim, the cap 20 and plug 18 are removed from the wrench member 17 so as to provide a continuous vertical bore through said wrench member. The nut to be removed is then fitted into the upper end of the wrench member 17 and the handle 10 of the wheel 11 is given a turn, whereby through the gears 7, 14, and 15 the wrench member is rotated so as to unscrew the nut. As soon as the nut is entirely free from the bolt on the wheel it drops through the wrench member 17. The wheel can then be rotated one step so as to bring the next nut into position within the wrench member 17. The stem 19 of the plug 18 preferably is provided with a nut or other stop member 22 which serves to prevent the spring 21 from throwing the plug too far upward within the wrench member 17.

When the machine is to be used for applying nuts to the rim of a wheel, the nut-feeding mechanism 25 is brought into play, it being understood that when the wrench 17 is used for removing nuts, the nut-feeder 25 is swung backward into inoperative position so as not to interfere with the operation of the wrench 17 in removing nuts. The nut-feeding device 25 preferably consists of a vertically extending trough member, that is, a member which is approximately semi-circular in cross section. At its lower end the nut-feeder 25 is bent rearwardly as indicated at 26, and an opening 27 is cut through the rearwardly bent extension 26 so as to provide a space for the nut to drop through. The nuts 28 are held upon a vertically extending rod or guide 29 which is detachably engaged at its upper end between a pair of nuts or bolts 30 and 31 suitably held in position within the device 25 by means of the bolt 32. At its upper end the nut feeder 25 is pivotally mounted at 33 upon the casting 13. Pivotally mounted on the same fulcrum 33 is an arm 34 which is weighted at its upper end as indicated at 35 and at its lower end is bifurcated to produce two arms 36 and 37. The weighted arm 34 is adapted to hold the nut feeder 25 yieldingly in either operative or inoperative position by being merely swung across its center from the position shown in Fig. 3 to a position wherein the weight 35 is located in advance of the pivot point 33.

When the weighted arm 34 is in the position illustrated in Fig. 3, the projection or boss member 37 thereof engages the rear portion of the nut-feeder 25 and serves normally to swing the same forward into the position shown in Fig. 3 so as to permit the bottom-most nut to drop into the opening 27. At the same time, the nut feeder 25 is yieldingly held whereby, when the wheel rim is pushed back into position over the wrench 17, said wheel rim likewise pushes the nut feeder 25 out of the way. The rearward extension 26 of the nut-feeder 25 is adapted, when pushed backwardly in the manner described, to engage or abut against a washer 40 which surrounds the shaft 6 and is eccentric to said shaft. By rotating the eccentric washer 40 upon the shaft 6, the distance to which the nut feeder 25 can be pushed backward by the wheel can be nicely adjusted. When in the position shown in Fig. 3, the washer 40 permits the feeder and consequently the wheel rim to be pushed backward some distance upon the arm 4; but if the washer 40 were turned in the other position, the nut feeder 25 could only be pushed backward to a limited extent. The eccentric washer 40 thus serves as means for limiting the movement of the wheel rim upon the table 4, and thus serves as means for alining rims of different thicknesses and character properly above the wrench member 17. For example when a wide or broad-gage wheel rim is being operated upon, the eccentric washer 40 will be adjusted as illustrated in Fig. 3; but when a narrow rim is being operated upon, and it is necessary to center the nuts thereof above the wrench 17, the eccentric washer 40 is rotated so that the thick or wide portion thereof will abut against the rearward extension 26 of the nut feeder 25. Therefore when the narrow wheel rim is shoved backward on the table 4, it will only be able to push the nut feeder 25 a short distance backward before the extension 26 abuts against the eccentric washer 40, thus indicating the extent to which the wheel rim should be pushed backward in order to center the nuts thereof above the wrench 17.

When it is desired to remove nuts, instead of applying them, it is desirable that the nut-feeder 25 be moved entirely out of the way. In order to accomplish this result the weighted lever 34 is thrown forward so that the arm 36 thereof bears against the forward portion of the nut feeder 25 and causes the lower end thereof to swing backward against the thin portion of the washer 40, thus holding the nut feeder 25 in inoperative position so long as the weighted lever or arm 34 is held with its weight 35 in advance of the pivot point 33. The plug 18 is removed from the wrench 17 during this operation of taking off the nut. When the operation is to be reversed, that is, when nuts are to be applied, the plug 18 is replaced within the wrench 17 and the weighted lever 35 is thrown over into the position shown in Fig. 3 so as to cause the nut feeder 25 to lie normally in position above the wrench 17, said nut feeder being merely pushed back from time to time when the wheel rim is shoved into place.

The forward movement of the nut feeder 25 is limited by means of a chisel or other similar member 45 which is likewise adapted to be used as means for holding a bolt firmly in position in the tire during the operation of removing or replacing the nut. The chisel 45 is mounted upon the end of an arm 46 which, as shown in Fig. 1, is bent upon itself in the form of a loop and extends downward through the arms 13, 5 and 4 of the casting 3 and is slidably mounted therein. At its lower end, the arm 46 is pivotally connected at 47 with a foot treadle 48 which is fulcrumed at 49 upon the standard 2. In screwing nuts on the bolts the bolts sometimes will rise in the rim so as to render it difficult to fit the nuts thereon. In order to avoid this difficulty the operator places his foot upon the treadle 18 which thereupon draws the chisel 45 down into position to rest securely on the head of the bolt thus holding it properly in position to receive the nut. The chisel 45 can likewise be employed in removing nuts. The chisel 45 is normally held in the raised position illustrated in the drawings by means such as the counter-weight 50 shown best in Fig. 2 of the drawings. The counter-weight 50 is adjustably mounted at 51 upon an arm 52 which is fulcrumed at 53 upon a depending arm 54 connected with the table 4. The upper end of the lever 52 is fulcrumed at 55 on a collar 56 which is mounted upon the arm or rod 46 which carries the chisel 45. It will be obvious that the counter-weight 50 holds the chisel 45 normally in raised position.

The means for supporting the wheel which is being operated upon preferably includes a stud shaft 60 which is connected with a collar 61 adjustably mounted upon a sleeve 62, the adjustment of the collar 61 being secured by means of a set screw 63. The sleeve 62 is loosely mounted upon the rod 46, so that the sleeve 62 and the rod 46 can operate independently of each other. The sleeve 62 is yieldingly supported by means of a counter-weight 64 which is adjustably connected at 65 with a lever 66, fulcrumed at 67 upon an arm 68 which depends from the table 4, the lever 66 being fulcrumed at 69 upon a collar 70 fixed to the upper end of the sleeve 62. By adjusting the weight 64 upon the lever 66, the weight of any wheel which is mounted upon the hub 60 as indicated in the dotted lines can be counterpoised. The adjustment of the stud-shaft 60 upon the sleeve 62 permits wheels of different diameters to be employed the distance which the stud-shaft 60 is normally located away from the table 4 depending upon the diameter of the particular wheel which is being operated upon. It will be seen therefore that the machine of the present invention is adapted to operate with wheels of different weights, different sizes and different breadths. By counterpoising the weight of the wheel, the operator can readily move it up and down and shove it on and pull it off of the table 4 during the operation of removing or applying nuts.

What is claimed as new is:—

1. A machine of the character specified having a vertically movable sleeve, a guide for said sleeve, a stud shaft having a collar surrounding said sleeve, a set screw extending through said collar for adjusting said stud shaft on said sleeve, a lever pivotally connected with said sleeve, and a weight adjustably mounted upon said lever for counterpoising the weight of said stud shaft and the work carried thereby.

2. A machine of the character specified having a wrench, a movable nut feeder, and a clamping device for coöperating with the wrench, said clamping device limiting the movement of said nut feeder.

3. A machine of the character specified having a work support, a work table, a wrench on the table, a swinging nut feeder substantially in line with said wrench when in feeding position, and a clamp adapted to coöperate with said wrench.

4. A machine of the character specified having a work support, a work table, a wrench mounted on said table, a swinging nut feeder, a clamp coöperating with said wrench, and gage means mounted adjacent to said wrench, and limiting the movement of said nut feeder.

5. A machine of the character specified having a work support, means for adjusting said support, means for counter-balancing said support, a work table, a rotary wrench on the table, a plug removably and yieldingly mounted in said wrench, means for rotating said wrench, a swinging nut feeder, a gravity actuated device for holding said nut feeder in operative or inoperative position, an eccentric washer for limiting the swing of said nut feeder, a vertically adjustable clamping member for coöperating with the wrench, and a foot lever for operating said clamping member.

6. A machine of the character specified having a wrench, a movable nut feeder, and a stop for limiting the movement of said nut feeder, said nut feeder constituting a stop to position the work with relation to the wrench.

7. A machine of the character specified having a wrench, a movable nut feeder, and an adjustable stop for limiting the movement of the nut feeder, said nut feeder constituting a stop to position the work with relation to the wrench.

8. A machine of the character specified having a wrench, a pivotally movable nut feeder, and an eccentric stop for limiting the movement of said nut feeder, said nut feeder constituting a stop to position the work with relation to the wrench.

9. A machine of the character specified, having a swinging nut feeder adapted to position the work, a wrench for operating on the work while so positioned by the nut feeder, and an adjustable device for limiting the swinging movement of the nut feeder.

10. A machine of the character specified having a movable nut feeder adapted to position the work, a wrench for acting on the work while so positioned by the nut feeder, and a rotatable eccentric washer for limiting the movement of said nut feeder, substantially as and for the purpose specified.

11. A bolting machine including a revoluble wrench, a yieldable nut support within the wrench, and means for directing nuts by gravity onto the support.

12. A bolting machine including a revoluble wrench, an adjustable nut support yieldingly mounted within the wrench, and means for directing nuts by gravity onto the support.

13. A bolting machine including a revoluble wrench, a yieldable nut support removably mounted therein, and means for directing nuts by gravity onto the support.

14. A bolting machine including a revoluble wrench, an adjustable nut support removably mounted within the wrench, this support being yieldable, means for detachably securing the support within the wrench, and means for directing nuts by gravity onto the support.

15. In a machine of the class described, a wrench member mounted to revolve on a vertical axis and having its upper end recessed to receive a nut, a nut conduit leading to the recess of the wrench, a member adapted to slide a nut along the nut conduit and into the wrench, and means carried by said member for retaining said nut in the feed line if it fails to enter the wrench.

16. In a machine of the class described, a suitable support, mechanism on the support to act on a vehicle wheel, a bar mounted to have vertical movement on said support and adapted to control said mechanism, a sleeve mounted slidably on said bar, means on the bar to support said sleeve, an arm depending pivotally from said sleeve, and a pin projection on the lower end of said arm to enter the hub of said wheel.

In testimony that I claim the foregoing as my own, I have hereto affixed my signature in the presence of two witnesses.

MATTHEW T. LONG.

Witnesses:
GEO. C. REDMAN,
C. L. GREEN.

---

Copies of this patent may be obtained for five cents each, by addressing the "Commissioner of Patents, Washington, D. C."